United States Patent
Bowman et al.

(10) Patent No.: US 12,051,949 B2
(45) Date of Patent: Jul. 30, 2024

(54) ASYMMETRICAL SKEWED ROTOR

(71) Applicant: MAHLE International GmbH, Stuttgart (DE)

(72) Inventors: Brett Bowman, Lockport, NY (US); Brent Haseley, Niagara Falls, NY (US)

(73) Assignee: MAHLE International GmbH, Stuttgart (DE)

( * ) Notice: Subject to any disclaimer, the term of this patent is extended or adjusted under 35 U.S.C. 154(b) by 97 days.

(21) Appl. No.: 17/151,823

(22) Filed: Jan. 19, 2021

(65) Prior Publication Data

US 2022/0231585 A1 Jul. 21, 2022

(51) Int. Cl.
| | |
|---|---|
| *H02K 16/02* | (2006.01) |
| *H02K 1/02* | (2006.01) |
| *H02K 1/278* | (2022.01) |

(52) U.S. Cl.
CPC .............. *H02K 16/02* (2013.01); *H02K 1/02* (2013.01); *H02K 1/278* (2013.01); *H02K 2201/06* (2013.01)

(58) Field of Classification Search
CPC ...... H02K 16/02; H02K 2201/06; H02K 7/04; H02K 1/276; H02K 15/16; H02K 15/165; H02K 1/02; H02K 1/278; H02K 1/32
USPC ....................................... 310/156.47, 156.57
See application file for complete search history.

(56) References Cited

U.S. PATENT DOCUMENTS

| | | | |
|---|---|---|---|
| 2,830,209 A | 4/1958 | Fleckenstein | |
| 3,783,318 A | 1/1974 | Widstrand | |
| 11,223,262 B1* | 1/2022 | Bender | H02K 15/03 |
| 2002/0140307 A1* | 10/2002 | Yanashima | H02K 1/276 |
| | | | 310/211 |
| 2007/0108851 A1* | 5/2007 | Hashiba | H02K 1/2786 |
| | | | 310/58 |
| 2012/0049686 A1* | 3/2012 | Mizuike | H02K 1/28 |
| | | | 310/156.53 |
| 2013/0257189 A1* | 10/2013 | Blum | H02K 7/04 |
| | | | 29/598 |
| 2015/0097458 A1* | 4/2015 | Wang | H02K 1/2766 |
| | | | 310/156.01 |
| 2018/0262081 A1* | 9/2018 | Shelton | H02K 1/146 |
| 2020/0212758 A1* | 7/2020 | Kim | H02K 1/22 |

FOREIGN PATENT DOCUMENTS

| | | |
|---|---|---|
| CN | 1906825 A | 1/2007 |
| CN | 101111983 A | 1/2008 |
| CN | 101267130 A | 9/2008 |

(Continued)

OTHER PUBLICATIONS

Machine translation of DE-102019207879-A1. (Year: 2019).*

*Primary Examiner* — Michael Andrews

(74) *Attorney, Agent, or Firm* — Dickinson Wright PLLC

(57) ABSTRACT

Asymmetric skewed rotors and an electric motor that incorporates said rotors. The rotor being are configured to rotate within a stator positioned to surround a portion of the rotors. The stator and rotors are aligned along a centerline (x). Each rotor includes an asymmetric feature, such that during operation dynamic balance results when the asymmetric feature on each rotor are aligned opposite one another perpendicular to the centerline (x) and static balance results when the asymmetric feature on each rotor are aligned opposite one another parallel to the centerline (x).

19 Claims, 3 Drawing Sheets

(56) References Cited

FOREIGN PATENT DOCUMENTS

| | | |
|---|---|---|
| CN | 101523707 A | 9/2009 |
| CN | 101577472 A | 11/2009 |
| CN | 102593977 A | 7/2012 |
| CN | 103036337 A | 4/2013 |
| CN | 103931082 A | 7/2014 |
| CN | 107872107 A | 4/2018 |
| CN | 109428416 A | 3/2019 |
| CN | 109599964 A | 4/2019 |
| CN | 111313640 A | 6/2020 |
| DE | 694327 C | 7/1940 |
| DE | 1488657 A1 | 6/1969 |
| DE | 102017213890 A1 | 2/2019 |
| DE | 102019207879 A1 * | 12/2020 |
| FR | 3069730 A1 | 2/2019 |
| GB | 887047 A | 1/1962 |
| GB | 1124015 A | 8/1968 |
| GB | 2468718 A | 9/2010 |
| WO | 2020043966 A1 | 3/2020 |

* cited by examiner

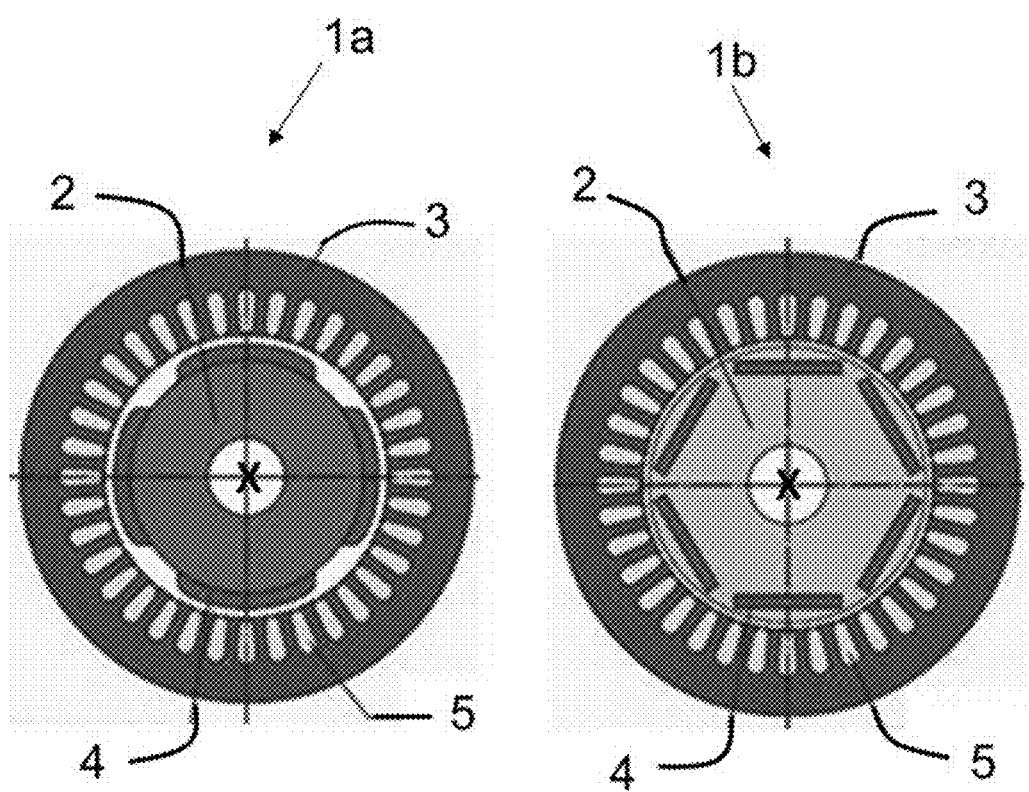
Fig. 1A
Conventional
Fig. 1B
Conventional

ASYMMETRICAL SKEWED ROTOR

FIELD

This disclosure relates generally to an asymmetrical skewed rotor configured for use in an electric motor, such as a permanent magnet synchronous motor (PMSM).

BACKGROUND

The statements in this section merely provide background information related to the present disclosure and may not constitute prior art.

The use of electric motors in many applications, such as high speed transportation, have transitioned from direct current (DC) drives to alternating current (AC) drives due to the evolution of power electronics, such as the development of improved inverters and use of vector control methodology. AC drives in comparison to DC drives provide greater reliability, high efficiency and superior power density along with lower maintenance requirements. AC drives typically associated with induction motors (IM) and permanent magnet synchronous motors (PMSM). The current trend seems to be transitioning to the preferential use PMSM technology based upon the potential for high efficiency and power density even though this technology is also linked to higher manufacturing and material costs.

A PMSM is an AC synchronous motor whose field excitation is provided by permanent magnets. A PMSM may include magnet arrangements located on the surface or interior of the rotor with such magnets exhibiting radial or tangential magnetization. The performance of a PMSM with surface mounted magnets is similar to a synchronous motor having a cylindrical rotor in which the torque is entirely generated by the interaction between the flux of the rotor and the stator current. Although the PMSM offer many advantages, this technology also exhibits many disadvantages, such as the constant flux provided by the magnets and the high costs associated with the rare-earth magnets. In addition, the rotors associated with PMSM are known to exhibit cogging torque, as well as produce harmonics and vibrations during operation that require the use rotor skewing to reduce harmonics and axial counterweights to reduce vibration, which increase the size (e.g., length for use of end-mounted counterweights) and cost associated with the motor assembly.

SUMMARY

The present disclosure generally provides a plurality of asymmetric skewed rotors for use in an electric motor, as well as the electric motor formed therefrom. The rotors are configured to rotate within a stator positioned to surround a portion of the rotors with the stator and rotors being aligned along a centerline (x). Each of the rotors includes an asymmetric feature, such that during operation dynamic balance results when the asymmetric feature on each rotor are aligned opposite one another perpendicular to the centerline (x) and static balance results when the asymmetric feature on each rotor are aligned opposite one another parallel to the centerline (x).

According to another aspect of the present disclosure, the asymmetric skewed rotors are incorporated into an electric motor, including without limitation, a permanent magnet synchronous motor (PMSM). The rotor representing the rotating mechanism that is at least partially surrounded by the stator.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1A is a schematic representation of a conventional stator and rotor in a PMSM viewed along the centerline (x);

FIG. 1B is schematic representation of another conventional stator and rotor in a PMSM viewed along the centerline (x);

The drawings described herein are for illustration purposes only and are not intended to limit the scope of the present disclosure in any way. It should be understood that throughout the description, corresponding reference numerals indicate like or corresponding parts and features.

DETAILED DESCRIPTION

Figure 2A:
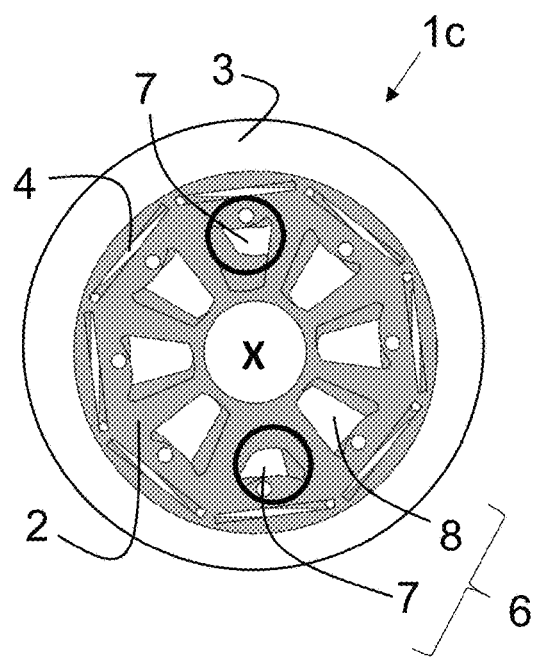
FIG. 2A is a schematic representation of a stator and asymmetric skewed rotor according to the teachings of the present disclosure viewed along the centerline (x) that exhibits dynamic balance.

Various embodiments described herein are focused towards an asymmetric skewed rotor configured for use as a rotating mechanism within an electric motor. The following description is merely exemplary in nature and is not intended to limit the present disclosure, application, or uses. For example, the asymmetric rotor elements made and used according to the teachings contained herein are described throughout the present disclosure in conjunction with a permanent magnet synchronous motor (PMSM) in order to more fully illustrate the construction and the use thereof. The incorporation and use of such rotor elements in any machinery, industrial equipment, or other apparatus that requires an electric motor, such as without limitation a PMSM, a servomotor, or the like, are contemplated not to exceed the scope of the present disclosure.

The present disclosure generally provides asymmetric skewed rotors for use as part of the rotating mechanism in an electric motor, as well as an electric motor that includes such rotors. A rotating mechanism of a motor must be balanced in order to achieve noise, vibration and performance targets. The use of asymmetric skewed rotors as described above and further defined herein achieves these goals without the need to add external counterweights to the design, thereby reducing overall cost and axial packaging space. When desirable, supplementary counterweights may still be used but the size of such weights can be minimized.

Referring to FIGS. 1A and 1B, a conventional electric motor 1a, 1b, including without limitation an alternating current (AC) electric motor generally includes a rotor 2 and a stator 3. When the AC electric motor is a permanent magnet synchronous motor (PMSM), the rotor includes a plurality of permanent magnets 4 and the stator includes a coil winding 5. A PMSM motor can be separated into two main types, either a surface permanent magnet motor or an interior permanent magnet motor (IPM). More specifically, the permanent magnets 4 may be located by affixing them to the surface of the rotor 2 as shown in FIG. 1A or positioning them inside of the rotor 2 as shown in FIG. 1B. Both of these motor types generate a magnetic flux by the permanent magnets affixed to or inside of the rotor. The surface mounting of the magnets may weaken the mechanical strength of the assembly, thereby, limiting the safe mechanical speed at which the motor may operate. On the other hand, embedding the permanent magnets 4 into the rotor 2 makes the motor very mechanically sound and suitable for operating at very high speeds.

Still referring to FIG. 1A and FIG. 1B, the magnets 4 may be placed in multiple locations, however, such placement is done such that a symmetric pattern around a centerline (x) results. Each of the magnets may be inset as a large block or staggered as they come closer to the core. Another method is to have them imbedded in a spoke pattern. The number of magnets 4 may range from four to about 20, alternatively, 12 or less. Alternatively, the number of magnets 4 are represented by an even number, such as but not limited to four (see FIG. 1A), six (see FIG. 1B), eight, ten, or twelve. The permanent magnets may include, but not be limited to, neodymium-iron-boron (Nd—Fe—B), samarium-cobalt (Sm—Co), aluminum-nickel-cobalt (alnico), or ferrites (barium and strontium).

Figure 2B:
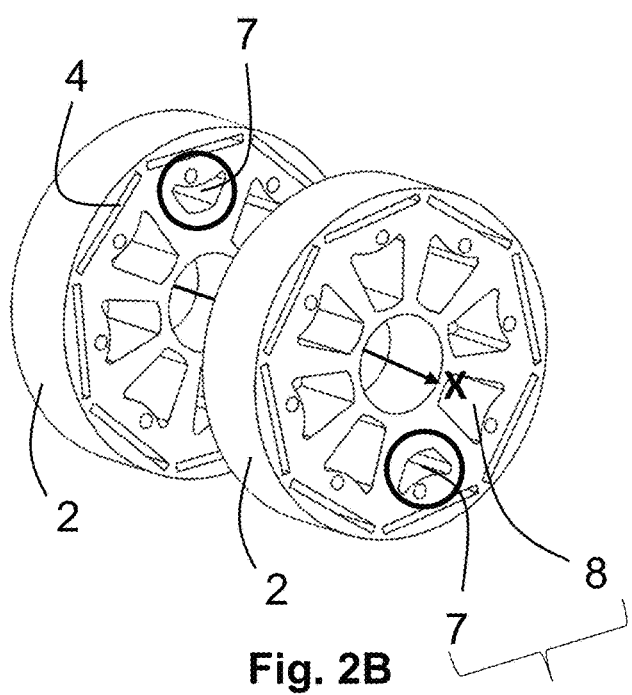
FIG. 2B is a perspective view of the asymmetric skewed rotor in FIG. 2A further exhibiting dynamic balance.
Figure 3A:
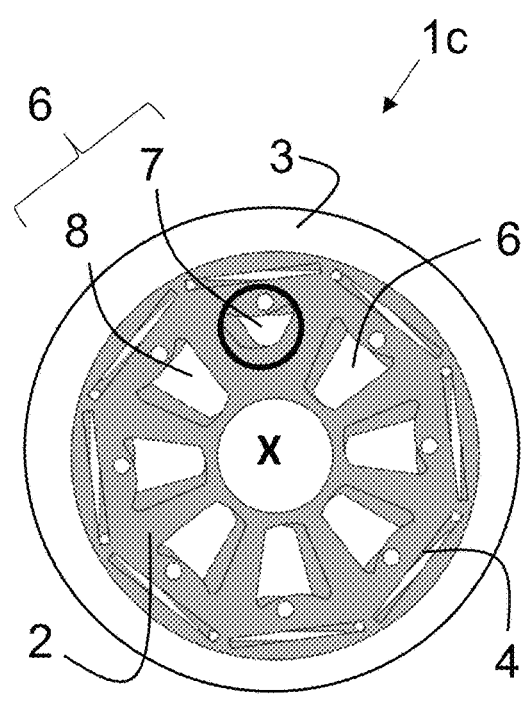
FIG. 3A is a schematic representation of a stator and asymmetric skewed rotor according to the teachings of the present disclosure viewed along the centerline (x) that exhibits static balance.
Figure 3B:
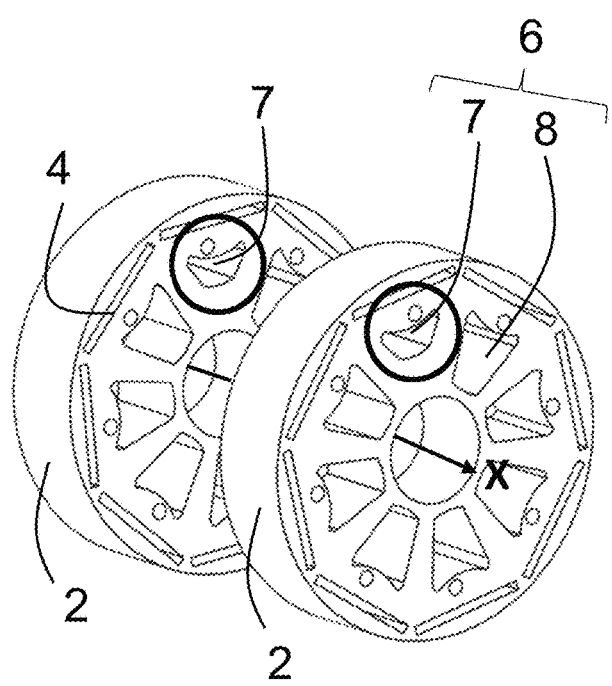
FIG. 3B is a perspective view of asymmetric skewed rotor in FIG. 3A further exhibiting static balance.

The stator windings 5 in the stator 3 of the permanent magnet synchronous motor (PMSM) 1a, 1b generates a rotating magnetic field that repels the magnetic fields exhibited by the permanent magnets 4, thereby creating the rotation of the rotor 2. The efficiency of a PMSM over other motors, such as an induction motor, is largely due to the rotor magnets creating an independent and permanent magnetic field, as additional current does not need to be induced to create the rotor field Referring now to FIGS. 2A, 2B, 3A, and 3B, the permanent magnet synchronous motor (PMSM) 1c according to one aspect of the present disclosure, a plurality of rotors 2 configured to rotate within a stator 3 positioned to surround a portion of the rotors 2, the stator 3 and rotors 2 being aligned along a centerline (x). Each rotor 2 includes an asymmetric feature 7, such that during operation dynamic balance (shown in FIGS. 2A & 2B) results when the asymmetric feature 7 on each rotor 2 are aligned opposite one another perpendicular to the centerline (x) and static balance (shown in FIGS. 3A & 3B) results when the asymmetric feature 7 on each rotor 2 are aligned opposite one another parallel to the centerline (x).

The asymmetric skewed rotors 2 may comprise a lamination stamping. This lamination stamping may include one or more symmetric features 8 in addition to the asymmetric feature 7. Any type of material known for use in lamination stamping for a motor assembly may be utilized, including but not limited to cobalt-iron alloys, nickel-iron alloys, silicon or electrical steel, iron-boron-silicon alloys, and lamination steel. Still referring to FIGS. 2A, 2B, 3A, and 3B, the symmetric features 8 and asymmetric feature 7 may be orifices 6 that are formed in the rotors 2. The shape of these orifices 6 may include any type of geometric shape. Examples of possible geometric shapes include, but are not limited to, a circle, oval, square, rectangle, triangle, rhombus, trapezoid, hexagon, octagon, or parallelogram. Alternatively, the shape of the orifice 6 is a circle, rectangle, rhombus, triangle, or trapezoid. Any shape may be used for the orifice 6 may be utilized provided that such shape is optimized to not affect the magnetic circuit of the rotor. The orifice 6 of the asymmetric feature 7 may configured to be a portion of the orifice 6 of the symmetric features 8. For example, if the orifice 6 of the symmetric features 8 is a circle, the orifice 6 of the asymmetric feature 7 may be a half circle.

The number of orifices 6 in the rotors 2 may range from four to about 20, alternatively, 12 or less. Alternatively, the number of orifices 6 are represented by an even number, such as but not limited to four, six (see FIG. 2A, 2B, 3A, 3B), eight, ten, or twelve. The number of orifices 6 may reflect the number of magnets or magnetic poles incorporated with rotor in order to reduce the overall mass of the rotor. The other features of the rotor, such as, for example, the type and number of permanent magnets, the material composition of the lamination stamping, and the design and configuration of the stator and the stator windings may be similar or the same as that found in conventional motors.

According to another aspect of the present disclosure, an electric motor, such as a PMSM, is formed using the rotors described above and further defined herein. This electric motor includes a stator positioned to at least partially surround the rotors. The stator and rotors being positioned, such that they are aligned along a centerline (x).

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A motor having a rotating mechanism, the rotating mechanism comprising a stator that surrounds a portion of a plurality of rotors, the stator and rotors being aligned along a centerline (x);
   wherein each rotor includes an asymmetric feature, the asymmetric feature being an orifice formed through the rotor and open on each end; the asymmetric feature in each rotor being substantially the same;
   wherein the asymmetric feature on each rotor is aligned opposite one another perpendicular to the centerline (x), such that the plurality of rotors are in dynamic balance.

2. The motor according to claim 1, wherein the motor is an alternating current (AC) motor.

3. The motor according to claim 2, wherein the AC motor is a permanent magnet synchronous motor (PMSM).

4. The motor according to claim 3, wherein the PMSM includes a plurality of permanent magnets arranged on the surface of the rotors or internally located within the body of the rotor.

5. The motor according to claim 4, wherein each of the permanent magnets is independently selected as neodymium-iron-boron (Nd—Fe—B), samarium-cobalt (Sm—Co), aluminum-nickel-cobalt (alnico), or ferrites (barium and strontium).

6. The motor according to claim 1, wherein each rotor comprises a lamination stamping comprising-one or more symmetric features in addition to the asymmetric feature.

7. The motor according to claim 6, wherein the one or more symmetric features are orifices formed in the rotor;
wherein the orifice of the asymmetric feature is shaped differently than the orifice of the symmetric feature.

8. The motor according to claim 7, wherein the orifices of the asymmetric and the symmetric features are shaped such that they are circular, oval, square, rectangular, triangular, rhombus, trapezoid, hexagon, octagon, or parallelogram.

9. The motor according to claim 7, wherein the orifice of the asymmetric feature represents a portion of the orifice of the symmetric features.

10. A method of manufacturing the motor having the rotating mechanism according to claim 1, the method comprising the steps of:
providing the plurality rotors, wherein the rotors comprise a laminated stamping that includes one or more symmetric features and the asymmetric feature; the asymmetric feature being aligned such that the plurality of rotors are in dynamic balance; and
assembling the plurality of rotors with the stator, such that the stator and rotors are aligned along the centerline (x) with the stator surrounding a portion of the rotors.

11. A plurality of rotors for use in a motor, the rotors configured to rotate within a stator positioned to surround a portion of the rotors, the stator and rotors being aligned along a centerline (x);
wherein each rotor includes an asymmetric feature, the asymmetric feature being an orifice formed through the rotor and open on each end; the asymmetric feature in each rotor being substantially the same;
wherein the asymmetric feature on each rotor is aligned opposite one another perpendicular to the centerline (x), such that the plurality of rotors are in dynamic balance.

12. The rotor according to claim 11, wherein the motor is an alternating current (AC) motor.

13. The rotor according to claim 12, wherein the AC motor is a permanent magnet synchronous motor (PMSM).

14. The rotor according to claim 13, wherein the PMSM includes a plurality of permanent magnets arranged on the surface of the rotors or internally located within the body of the rotor.

15. The rotor according to claim 14, wherein each of the permanent magnets is independently selected as neodymium-iron-boron (Nd—Fe—B), samarium-cobalt (Sm—Co), aluminum-nickel-cobalt (alnico), or ferrites (barium and strontium).

16. The rotor according to claim 11, wherein each rotor comprises a lamination stamping comprising one or more symmetric features in addition to the asymmetric feature.

17. The rotor according to claim 16, wherein the one or more symmetric features are orifices formed in the rotor;
wherein the orifice of the asymmetric feature is shaped differently than the orifice of the symmetric features.

18. The rotor according to claim 17, wherein the orifices of the asymmetric and the symmetric features are shaped such that they are circular, oval, square, rectangular, triangular, rhombus, trapezoid, hexagon, octagon, or parallelogram.

19. The rotor according to claim 17, wherein the orifice of the asymmetric feature represents a portion of the orifice of the symmetric features.

* * * * *